United States Patent [19]

Ellis, Jr.

[11] 4,420,374
[45] Dec. 13, 1983

[54] WATER DEGASIFICATION AND DISTILLATION APPARATUS

[76] Inventor: John C. Ellis, Jr., 1084 Palmer Ave., Larchmont, N.Y. 10538

[21] Appl. No.: 269,880

[22] Filed: Jun. 3, 1981

[51] Int. Cl.³ .......................... B01D 3/02; C02F 1/04
[52] U.S. Cl. .................................. 202/176; 202/180;
  202/181; 202/185 D; 202/188; 202/195;
  202/234; 99/295; 203/10; 203/22; 219/523
[58] Field of Search ............... 202/181, 180, 83, 234,
  202/190, 194, 196, 188, 189, 185 C, 185 D, 176,
  163, 200, 202, 203; 203/10, 11, DIG. 17, DIG.
  16, 1, 100, 99, 39; 55/195, 208; 249/82;
  277/166, 206; 99/295

[56] References Cited

U.S. PATENT DOCUMENTS

| | | | |
|---|---|---|---|
| 284,011 | 8/1883 | Herrick | 203/DIG. 17 |
| 771,832 | 10/1904 | Rochlitz | 202/196 |
| 851,045 | 4/1907 | Ullrick | 202/196 |
| 969,625 | 9/1910 | Hoffhine et al. | 202/196 |
| 1,010,508 | 12/1911 | McCune | 202/196 |
| 2,134,048 | 10/1938 | Kessel | 202/189 |
| 2,475,482 | 7/1949 | Clemens | 202/194 |
| 3,479,949 | 11/1969 | Reynolds et al. | 99/295 |
| 3,532,606 | 10/1970 | Sibert | 202/180 |
| 3,838,016 | 9/1974 | Powers | 202/181 |
| 3,935,077 | 1/1976 | Dennison | 202/180 |
| 4,081,331 | 3/1978 | Weiss | 202/181 |
| 4,135,984 | 1/1979 | Kirschmann | 202/83 |
| 4,178,842 | 12/1979 | Vitous | 99/295 |
| 4,187,150 | 2/1980 | Rich | 203/DIG. 16 |
| 4,247,369 | 1/1981 | Bean | 202/181 |
| 4,252,616 | 2/1981 | Glazer | 202/181 |
| 4,261,796 | 4/1981 | Lemoine | 202/181 |
| 4,269,663 | 5/1981 | McFee | 202/202 |

FOREIGN PATENT DOCUMENTS 109551 1/1940 Australia ............................ 202/196

Primary Examiner—Wilbur L. Bascomb, Jr.
Attorney, Agent, or Firm—Eugene E. Geoffrey, Jr.

[57] ABSTRACT

Water degasification and distillation apparatus having a container for water to be degasified and distilled, a relatively small boiler adjoining said container and having a first conduit extending into the container so that a selected water level in the container will fill said boiler to a selected height, a condenser within the container and immersed in the water contained therein, a second conduit extending from the space above the water in said boiler to the inlet of the condenser, an outlet on the condenser extending through a container wall for discharging degasified and distilled water and heating means in said boiler for heating the water therein at a rate greater than the capacity of the second conduit to handle the steam generated in the boiler.

3 Claims, 8 Drawing Figures

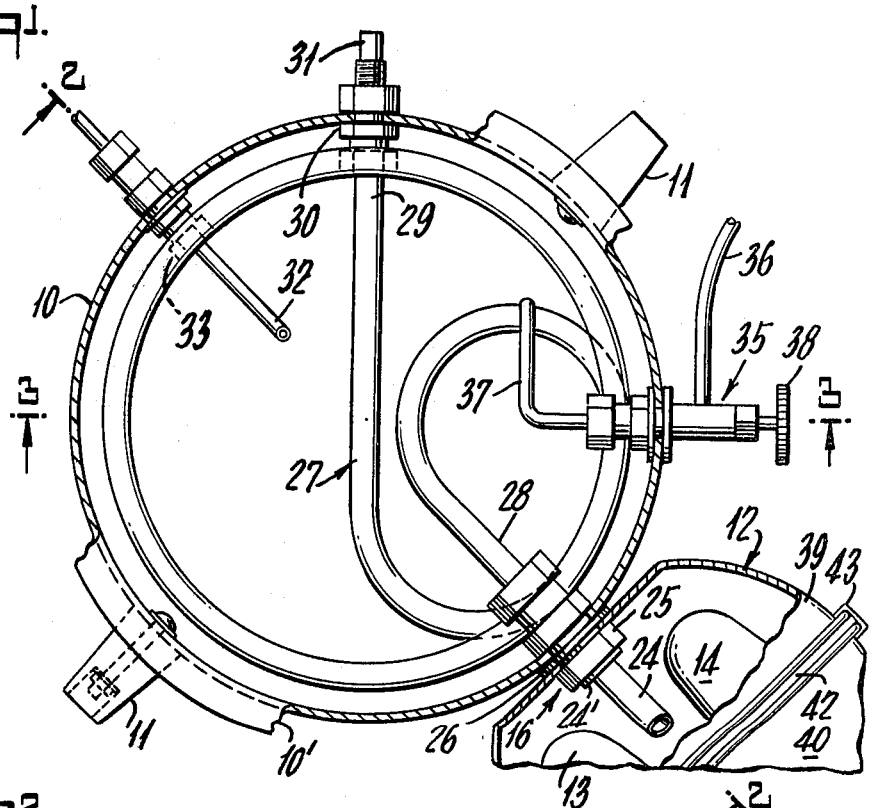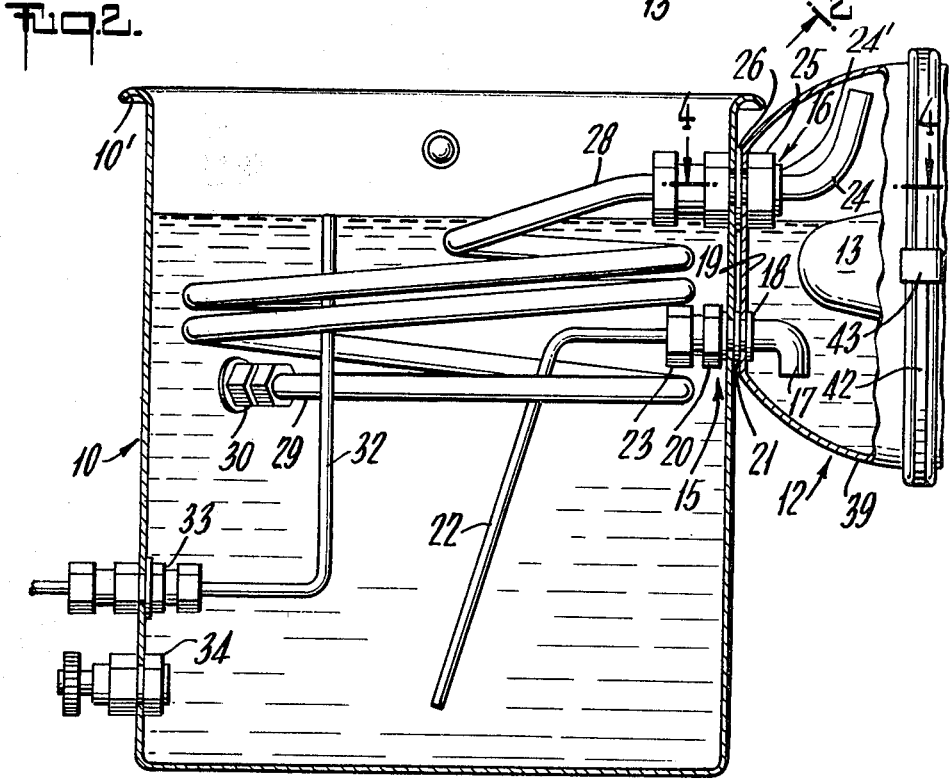

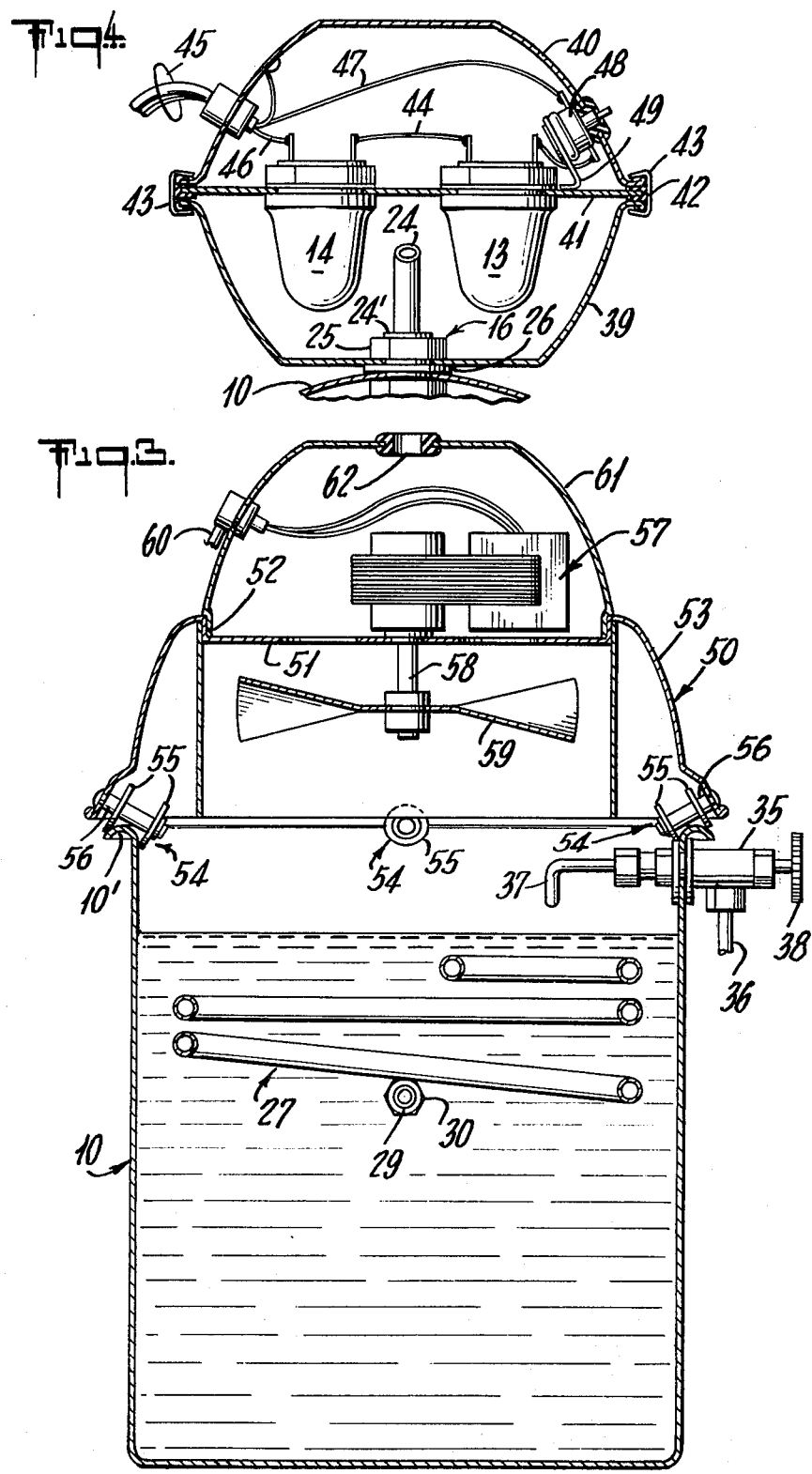

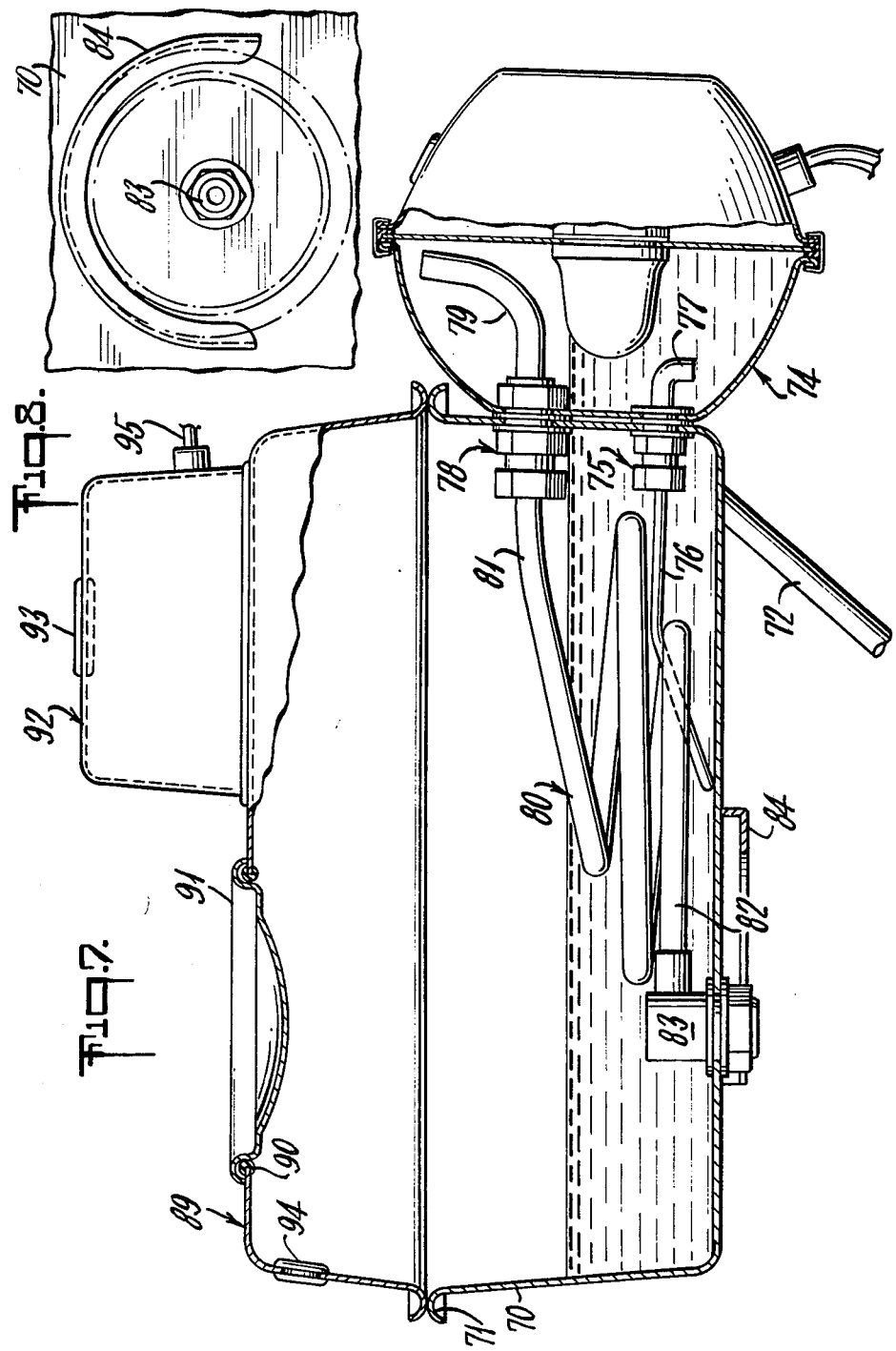

WATER DEGASIFICATION AND DISTILLATION APPARATUS

This invention relates to distilling apparatus and more specifically to novel and improved water degasification and distillation apparatus embodying means for boiling-off volatile constituents of the water prior to distillation thereof.

Known distilling apparatus generally involve the utilization of a closed boiler embodying means for continuously feeding water to the boiler. As the water in the boiler is heated to produce water vapor or steam, volatile chemical components of water having boiling points lower than the water will boil off and combined with the steam. The steam together with the volatile vaporized chemical components will then be condensed in a suitable condenser so that the resultant distillate will contain the volatile chemicals. In cases wherein the water has a disagreeable odor produced by sulphur compounds and the like, known apparatus tends to concentrate the odor and make the water even more distasteful. Applicant's prior pending application Ser. No. 22,321, filed Mar. 20, 1979, now U.S. Pat. No. 4,339,307 entitled: "Distillation Apparatus" discloses distilling apparatus embodying upper and lower chambers with the condensing coil disposed in the upper chamber which is normally filled with water and gradually fed into the lower chamber which is heated by a suitable means in order to produce steam. The steam is then fed upwardly through a condenser in the upper chamber and is then discharged from the condenser as a liquid. By operating the apparatus for a short period of time prior to the collection of the distilled water, the condenser will increase the temperature of the water in the upper chamber and boil off at least some of the volatile chemical components.

This invention constitutes an improvement over prior known distilling apparatus including the apparatus disclosed in applicant's pending application in that it embodies a very small boiler including instantaneous heating means and a condensing coil immersed within a reservoir which provides an automatic supply of water to the boiler and functions to cool the condenser. With this arrangement, the water in the reservoir, as will be shown, will circulate to and from the boiler and the heat thus imparted to the water in the reservoir together with the heat imparted by the condenser will heat the water in the reservoir to a temperature that will effectively boil off chemical constituents of the water and the time required for operation of the distiller in order to produce a distillate free of chemicals and undesirable odors is materially reduced.

Another object of the invention resides in the provision of novel and improved water distillation apparatus which not only avoids control means for feeding water from a reservoir to a boiler but also embodies an arrangement and organization of elements wherein both the reservoir and boiler are readily accessible for cleaning and maintenance.

A still further object of the invention resides in the provision of novel and improved distilling apparatus for the provision of hot distilled and substantially odor-free water for the brewing of coffee and tea as well as for use in the preparation of other foods such as soups and the like.

A still further object of the invention resides in the provision of a novel and improved water degasification and distillation apparatus characterized by its simplicity, ease of operation and maintenance and relatively low cost.

The water degasification and distillation apparatus in accordance with the invention includes a container or tank adapted to receive the water to be distilled. A small boiler having heating elements mounted therein is secured to one side of the tank and a fluid conduit couples the boiler to the tank so that the liquid level in the boiler will be controlled by the liquid level in the tank. A steam or vapor outlet in the boiler is coupled to a condenser disposed within the tank and the outlet of the condenser extends through the wall of the tank. The condenser is positioned in such a manner that the liquid in the tank will cover part or all of the condenser. With this arrangement and with the heaters in the boiler being energized, the liquid in the boiler will heat almost instantaneously and steam will be fed out through the condenser. If the pressure within the boiler exceeds the capacity of the outlet to receive steam or water vapor, pressure will force water in the lower portion of the boiler back into the tank. When the pressure is relieved, water will again flow into the boiler and this recirculation operation will continue during the operation of the distilling apparatus. Since hot water is being constantly returned to the tank and since heat is constantly removed from the condenser by the water within the tank, the water within the tank will increase in temperature and boil off undesirable chemicals contained in the water prior to distillation thereof. As cold water is fed to the tank, the cold water will normally go to the bottom while hot water from the boiler discharged into the bottom of the tank will tend to rise. This causes a constant movement of the water within the tank so that substantially all of the water in the tank is maintained at a substantially constant temperature to effect more complete removal of undesirable components. Means may also be provided in association with the tank for feeding condensed distilled and degasified water into brewing apparatus for making coffee, tea or merely provide hot water for other purposes.

The above and other objects and advantages of the invention will become more apparent from the following description and accompanying drawings forming part of this application.

In the Drawings:

FIG. 1 is a fragmentary plan view of one embodiment of the distilling apparatus in accordance with the invention;

FIG. 2 is a cross sectional view of FIG. 1 taken along the line 2—2 thereof;

FIG. 3 is a cross sectional view of FIG. 1 taken along the line 3—3 thereof and illustrates air circulating means carried by the container;

FIG. 4 is a cross sectional view of the boiler and a fragmentary portion of the tank taken along the line 4—4 thereof of FIG. 2;

FIG. 7 is a side elevational view in partial section of the water tank and boiler of FIG. 5; and FIG. 8 is a cross sectional view of FIG. 5 taken along the line 8—8 thereof.

Figure 6:
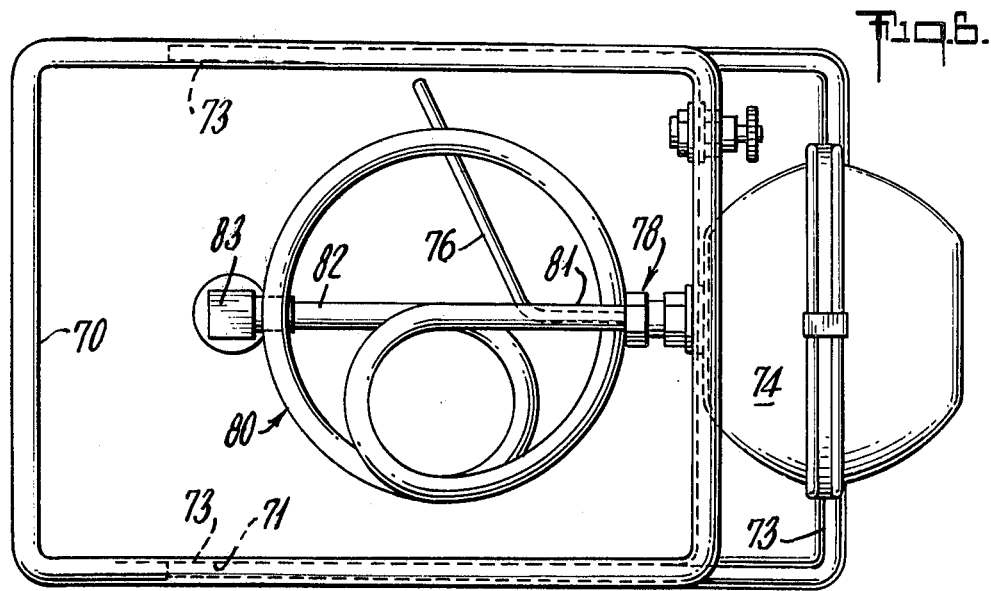
FIG. 6 is a cross sectional view of FIG. 5 taken along the line 6—6 thereof.

Referring now to the drawings and more specifically to FIGS. 1 through 4, the distilling apparatus in accordance with the invention comprises a cylindrical tank or container 10 having a pair of handles 11 secured to the side thereof. A boiler 12 having instantaneous heating elements 13 and 14 therein is affixed to the side of the tank 10 by the fluid connectors 15 and 16. The fluid connector 15 includes an elbow 17 having a shoulder 18 and a threaded shank extending through cooperating openings in the wall 19 of the boiler 12 and the wall of the tank 10. A nut 20 engages the shank of the fitting 15 and together with a resilient washer 21 provides a water-tight seal for both the tank 10 and the boiler 12. A water inlet tube 22 is fixedly coupled to the fitting 15 by means of a nut 23 so that water within the tank 10 will be automatically fed into the boiler 12 until the water level within the boiler corresponds to the water level in the tank. It will also be observed that the water level in the tank is preferably maintained at a level to effect total or at least substantial immersion of the heating elements 13 and 14 in the water within the boiler.

The steam outlet fitting 16 is of conventional construction and includes an outlet pipe 24, a threaded shank 24' extending through the walls of the tank and the boiler and secured thereto by a nut 25. A sealing washer 26 is disposed between the tank and the boiler to provide a water-tight connection. The condenser 27 in the instant embodiment of the invention is in the form of a coiled tube of metal such as stainless steel, copper or the like and has the inlet end portion 28 sealably connected to the fitting 16 within the tank 10. The outlet 29 of the condenser 27 has a fitting 30 extending through the wall of the tank 10 and provides the fluid outlet 31. The tank further includes an overflow pipe 32 which is connected to a fitting 33 sealed to the wall of the tank 10 and a drain cock 34 for draining liquid from the tank. A water inlet valve 35 is carried at the upper portion of the tank or container 10 and has an inlet 36, an outlet 37 within the tank and a hand-wheel 38 for regulating the water supply in order to maintain substantially constant level of the water within the tank.

The boiler is shown more clearly in FIG. 4 and consists of two housing elements 39 and 40. A circular wall 41 is disposed between the housing elements 39 and 40 and includes a peripheral seal 42 which is releasably clamped between the outer rims of the housing elements 39 and 40 by clips 43 about the periphery of the boiler 12. This arrangement completely seals the chamber formed by the housing portion 39 and the wall 41 and the boiler can be readily disassembled for cleaning. The heating elements 13 and 14 in the instant embodiment of the invention are carried by the wall 41 and are connected in series by a lead 44 connecting one terminal of one heater to one terminal of the other heater. The power line 45 has one lead 46 connected to the other terminal of the heater 14 while the second lead 47 is connected through a thermostat 48 to the other terminal of the heater 13. The thermostat is mounted on a bracket 49 in close proximity to the heater 13 and in the event the heater 13 reaches a temperature above the normal operating temperature, the thermostat will operate to open the circuit and de-energize both heaters 13 and 14. It is evident however that the heaters 13 and 14 could be arranged for parallel operation or in the alternative a single heater may be employed provided however it delivers the quantity of heat necessary for operation of the apparatus.

If desired, the tank or container 10 may be provided with a conventional cover having openings therein or in the alternative may utilize forced air circulation means for the removal of undesirable vapors liberated from the liquid within the tank 10 during the course of the distillation process. One embodiment of air circulating means is illustrated in FIG. 3. The air circulating means includes an inverted dished cover generally denoted by the numeral 50 which includes a flat upper wall 51, an upwardly extending peripheral wall 52 and a downwardly curved peripheral wall 53. The lower peripheral edge of the wall 53 carries three or more diagonally disposed rollers 54 each having spaced discs 55 rotatably carried by a shaft 56. The discs 55 engage the rolled edge 10' of the tank 10 and accordingly provide an annular vent between the cover 15 and the edges of the tank 10.

The wall 51 of the air circulating means shown in FIG. 3 includes a motor generally denoted by the numeral 57 which has a shaft 58 extending through the perforated wall 51 and carries a fan 59. Power is fed to the motor 57 by a cable 60 connected in a conventional manner to the motor. If desired, switch means may be provided for operation of the fan. The fan motor is covered by a dome-shaped housing 61 securely fitted to the cover 53 and secured thereto by any suitable means. In the instant embodiment of the invention, the dome-shaped housing 61 is adapted to frictionally engage the peripheral wall 52 of the cover 50. In operation, air is drawn in through an opening 62 and the perforated wall 51 whereupon it is directed downwardly over the water in the container and discharged through the annular opening between the container 10 and cover 50.

In the operation of the distillation apparatus described above, the tank 10 and boiler 12 are first filled with water to a level at least substantially covering the heating elements 13 and 14 as will be observed more clearly in FIG. 2. It will be observed that when filling the tank 10, water will automatically flow through conduit 22 into the boiler so that the level of the water in the tank will be the same as the water level in the boiler. Energy is then supplied to the heating elements 13 and 14 which will function to boil the water within the boiler 12. Steam from the boiler will emerge through the outlet 24 and then flow through the condenser 17 and the condensed steam will then be discharged as a liquid from the outlet 31. When initially operating this apparatus, it is generally desirable to discard the distillate until the water within the tank 10 has attained a normally operating temperature which is rapidly attained in the following manner. Heaters 13 and 14 are designed to heat the water within the boiler at a rate faster than the condenser 27 can accommodate the steam produced. Accordingly, pressure is developed within the boiler 12 and will force liquid from the boiler through the tube 22 back into the tank 10. As soon as the pressure is relieved within the boiler, water will again flow through the tube 22 back into the boiler with the result that there will be a periodic reversal of water flow through the tube 22. This action results in a substantial increase in temperature of the water within the tank 10 and contributes to the heat imparted to the water in the tank 10 by the action of the condenser 27. The temperature of the water tank 10 however is always below the boiling temperature and should preferably be in the range of 180° F. to 190° F. in order to be certain that undesirable components in the water are boiled off prior to actual distillation.

In one form of the invention utilizing a tank 10 having a volume of 1 to 2 gallons of water, a boiler 12 holding approximately 16 ounces of water, heating elements designed to dissipate from 1,500 to 2,000 watts, it will take approximately 15 minutes of operation for the water in the tank to reach a temperature of approximately 180° to 190° and the boiler will normally heat tap water above the boiling point within about 45 seconds. With this arrangement and after the warm-up period, substantially all volatile chemicals in the water are boiled off prior to distillation with the result that the distillate is substantially odorless and free of all undesirable components. In actual tests, it has been found that with distillation apparatus as described above, distilled water will be produced at the rate of one-half to three-quarters of a gallon per hour.

A modified form of the invention is illustrated in FIGS. 5 through 8. This form of the invention is intended for the brewing of coffee and for the production of hot distilled water for other purposes such as the brewing of tea, making of soups and the like.

It will become apparent from the following description of FIGS. 5 through 8 of the drawings that the operation of the brewer is substantially identical to the operation of the form of the invention shown in FIGS. 1 through 4. More specifically, the brewer comprises a tank or container 70 having an outwardly formed peripheral lip 71. The container is supported by a pair of Z-shaped brackets 72 coupled by a transverse element 73 which maintains the two brackets 72 in spaced relationship. The container 70 is supported by the upper horizontal bracket portions 73 which engage the peripheral lip 71 on the sides of the container 70. A boiler 74 substantially identical to the boiler 12 shown in FIG. 4 is affixed to one end of the container 70. Since the boiler functions in the same manner as the boiler 12 and is substantially identical thereto, a further description is not deemed necessary.

The boiler 74 is coupled to the container 70 by a fitting 75 having a water inlet 76 secured to one side thereof and a water outlet 77 disposed within the boiler 74. A second fitting 78 extends through the walls of the container 70 and boiler 74 and carries a steam outlet 79 on one end thereof. Within the container, the inlet end 81 of the condenser 80 is affixed to the fitting 78 and the outlet end 82 of the condenser is secured to a fitting 83 extending through an opening in the bottom of the container 70.

Figure 5:
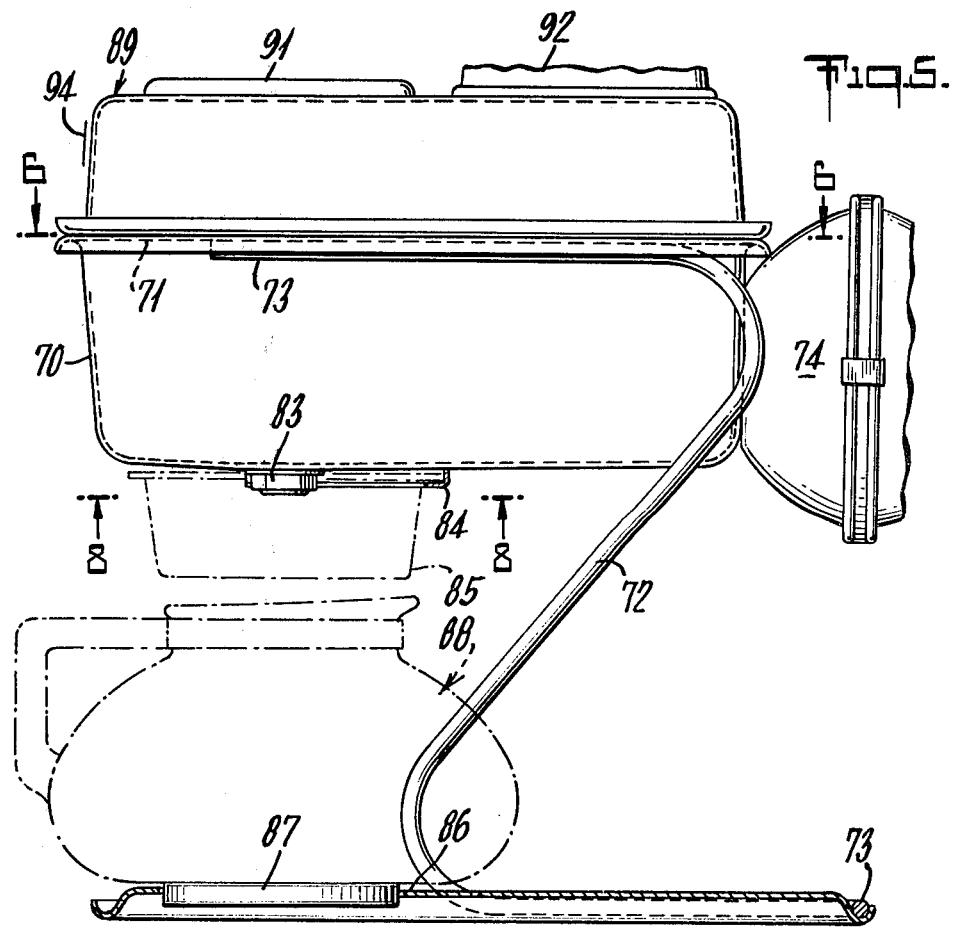
FIG. 5 is a side elevational view of a modified embodiment of the invention for producing distilled water for coffee and other foods.

The underside of the container 70 as shown in FIGS. 5 and 8 includes in the instant embodiment of the invention a semi-circular bracket 84 of L-shaped section for slidably receiving a basket 85 illustrated in broken-lines in FIG. 5 which may normally hold a filter and ground coffee. A base 86 engages and supports the Z-shaped bracket 72 and includes a conventional electric heating element 87. The heating element 87 is provided with suitable energizing conductors and switching means not shown so that it may be turned on and off as desired. The space between the bottom of the basket 85 and the top of the heating element 87 is of sufficient magnitude to receive a suitable receptacle 88 for receiving brewed coffee. It is obvious from the foregoing discussion that the basket 85 may be arranged to accommodate tea leaves for the brewing of tea or in the alternative the distilled water from the fitting 83 can be fed directly into the receptacle 88 for making soup or any other purpose for which purified distilled water may be required.

The container 70 includes a dished cover generally denoted by the numeral 89 which may be affixed to the container 70 by any suitable means. The cover 89 includes an opening 90 for feeding water into the container 70 and a cooperating lid 91. Forced air circulating means generally denoted by the numeral 92 is carried on the top side of the cover 91 and includes an electric motor and fan substantially similar to that illustrated and described in connection with FIG. 3. The air circulating means includes an air inlet opening 93 on the top side thereof and appropriate openings not shown are formed in the top of the cover 89 to permit the introduction of air into the space defined by the container 70 and lid 89. The air is exhausted from one or more outlets 94 in the cover and an electric cable 95 is utilized for energizing the fan and may include appropriate switch means.

The operation of the apparatus illustrated in FIGS. 5 through 8 is substantially identical to that described in connection with the preceeding embodiment of the invention. However, since the device is not arranged, though it may be, for the continuous distillation of water, the container is initially filled with water so that the level is just below the position of the inlet 81 of the condenser 80. If the container 70 is of sufficient size, the distillation process can continue until the vessel 88 has been filled. If larger amounts of distilled water are required, additional water can be added through the opening 90 as may be required in order to maintain the level of the water in the container at a height that will cause the heating elements in the boiler 74 to be at least partially covered.

While only certian embodiments of the invention have been illustrated and described, it is understood that alterations, changes and modifications may be made therein without departing from the true scope and spirit thereof.

What is claimed is:

1. Water degasification and distillation apparatus comprising a container for holding water to be degasified and distilled, a condenser having an inlet and outlet within said container, a boiler including heating means, individual conduits coupling said boiler to the inlet of said condenser and to said container, said boiler being positioned relative to said container so that the water level in the container will periodically be the same as the water level in the boiler and will partially fill the boiler, and said heating means will generate steam within said boiler at a rate greater than the capability of said condenser to handle the generated steam thus periodically forcing water from the boiler to the container and interrupting the boiling each time water is displaced from the boiler, said boiler being affixed to the outer side of said container, said individual conduits including a first conduit extending from said container into the lower portion of said boiler and a second conduit extending from the upper portion of said boiler into said container and coupled to the inlet side of said condenser, and said boiler is formed of two cooperating housing portions, a partition separating said housing portions and sealed to at least one of said housing portions and said heating means is carried by said partition and projects into said one housing portion and said first and second conduits communicating with said one housing portion with one of said conduits extending into said container for the circulation of water in said container to and from said boiler and the other of said conduits being connected to said condenser for condensing water vapor produced in said one housing portion by said heating means.

2. Water degasification and distillation apparatus according to claim 1 wherein said boiler housing portions are each in the form of a truncated hemisphere with the smaller end being closed by an integrally formed wall and the larger end carrying an outwardly extending peripheral flange, said partition is of circular configuration and a diameter corresponding to the diameter of said peripheral flange, at least one electrical heating element carried by said partition with the heating portion disposed on one side thereof and the terminals for energizing the heating portion disposed on the other side thereof, a gasket positioned between said partition and at least said one housing portion and means removably engaging at least said partition and the flange on said one housing portion to seal the partition to said one housing portion.

3. Water degasification and distillation apparatus according to claim 2 wherein said boiler is affixed to said container by a pair of cylindrical fittings extending through cooperating openings in said container and said one boiler housing portion and fittings comprise part of said first and second conduits.

* * * * *